Figure 1:
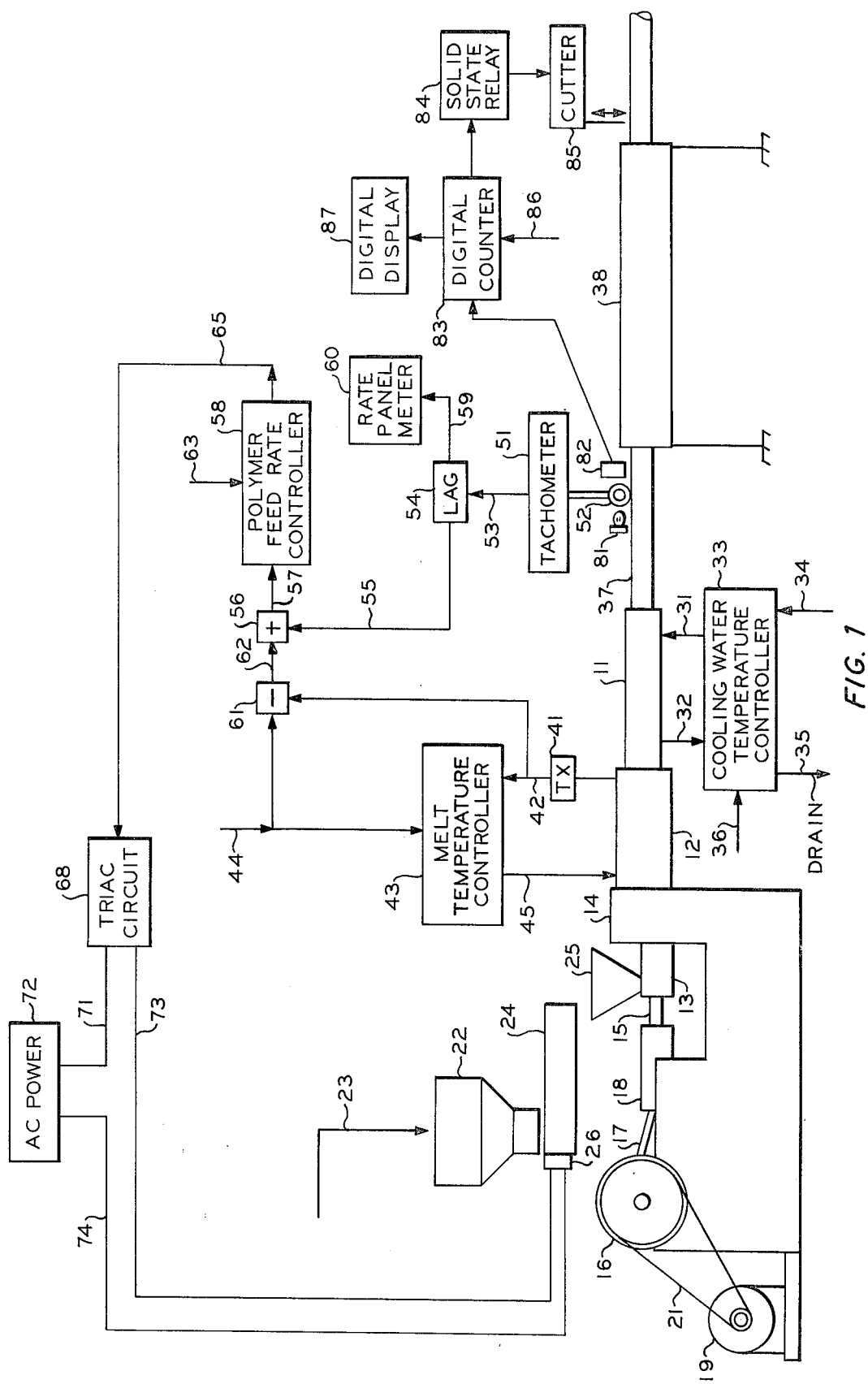

United States Patent [19]

LaSpisa et al.

[11] 4,120,630

[45] Oct. 17, 1978

[54] AUTOMATIC CONTROL OF EXTRUSION RATE

[75] Inventors: Ronald J. LaSpisa; Richard F. Giles, both of Bartlesville, Okla.

[73] Assignee: Phillips Petroleum Company, Bartlesville, Okla.

[21] Appl. No.: 666,283

[22] Filed: Mar. 12, 1976

[51] Int. Cl.² .............................................. B29F 3/08
[52] U.S. Cl. .................................. 425/142; 264/40.7; 425/144; 425/145; 425/379 R
[58] Field of Search ........................... 264/40.7, 40.2; 425/142, 141, 140, 145, 144, 380, 467, 143, 378 R, 379 R

[56] References Cited

U.S. PATENT DOCUMENTS

| | | | |
|---|---|---|---|
| 2,566,854 | 9/1951 | Rhodes | 264/40.7 |
| 2,649,618 | 8/1953 | Rhodes et al. | 425/142 X |
| 2,916,792 | 12/1959 | Crook et al. | 425/145 X |
| 3,393,427 | 7/1968 | Larsen | 425/379 |
| 3,483,597 | 12/1969 | Windeler et al. | 425/144 X |
| 3,698,844 | 10/1972 | Grimm | 425/144 |
| 3,699,197 | 10/1972 | Egger | 264/40.7 |
| 3,907,961 | 9/1975 | Carrow | 425/380 X |

FOREIGN PATENT DOCUMENTS 2,251,769 5/1974 Fed. Rep. of Germany ........... 425/145

*Primary Examiner*—Francis S. Husar
*Assistant Examiner*—Mark Rosenbaum

[57] ABSTRACT

The rate of extrusion of an elongated article from a dynamic extruder is measured and a measurement signal representative thereof is established. The measurement signal is then compared with a setpoint signal representing the desired extrusion rate to produce a control signal which is responsive to the difference between the measurement signal and the setpoint signal. The rate of introduction of polymer particles into the plasticization section of the extruder is automatically manipulated responsive to the control signal to maintain the extrusion rate at least substantially constant at the desired rate. The control signal can be adjusted to take into account variations in the temperature of the molten polymer entering the long land cooling die of the extruder.

8 Claims, 2 Drawing Figures

AUTOMATIC CONTROL OF EXTRUSION RATE

This invention relates to the extrusion of thermoplastic material. In a specific aspect the invention relates to dynamic extrusion with a long land die in which at least the outer portions of the extrudate are solidified prior to leaving the die, and more particularly to method and apparatus for automatically manipulating the feed rate of the thermoplastic particles to the extruder to maximize the extrusion rate.

It is common practice to produce articles from thermoplastic resins by extrusion processes wherein the resin is melted and forced through a die under pressure to form the article. This process is particularly useful in forming elongated articles such as pipes, bars, rods and the like. On extrusion method that has recently been developed is commonly referred to as "dynamic extrusion". The concept of dynamic extrusion includes the successive steps of compacting and transferring a multitude of thermoplastic particles through a heated plasticization zone to melt the particles into a pliable mass and then advancing the pliable mass into a long land die of particular cross-sectional configuration wherein at least the outer portions of the thermoplastic material of the extrudate solidify before leaving the die. While the dimensions of long land dies can vary considerably, depending upon the polymer, the extruder and the dimensions of the extrudate and the designed production rate, the die will generally have a land length in the range of about 10 to about 100 times the thickness of the extrudate. The foregoing steps can be effected by means of a piston which reciprocates in a passageway to force the particles of thermoplastic material, fed to the extruder, through the heated plasticization zone and the long land die. The dynamic extruder method requires a considerable amount of heat in order to melt the thermoplastic particles so that they can be passed through the plasticization chamber and into the long land die. Part of this heat is provided by the mechanical working of the thermoplastic material as it is passed through the plasticization chamber, and the balance of the heat is provided by external heaters.

In extrusion processes, particularly those involving the use of long land dies, one of the factors which limits production is the rate at which heat can be removed from the extrudate as it moves through the die. In order to provide adequate cooling, it is common practice to circulate a cooling fluid through heat exchangers adjacent the die passage. If a hollow article such as a pipe is being extruded, heat exchangers are often positioned both externally and internally of the die passage. The resulting cooling causes the resin to solidify and to shrink slightly. Because of this shrinkage, the surfaces of the extrudate may not remain in firm contact with the die. The resulting air gap acts as an insulator which tends to reduce the rate at which heat is removed. One solution to this problem involves the use of a tapered die to compensate for shrinkage as the resin solidifies. A die of this type is described in U.S. Pat. No. 3,393,427.

For a particular extruder with a particular die configuration and a given cooling capacity for the long land die, there is an optimum extrusion rate. However, as variations can occur in the feed rate of the thermoplastic material and in the melt temperature, it has been necessary to operate at a value of extrusion rate which is significantly less than the optimum extrusion rate in order to avoid exceeding the available cooling capacity. Variations in the temperature of the molten polymer entering the long land die section can occur because of variations in extrusion rate, variations in voltage to electrical heaters or gas flow rate to gas burners, variations in the environment such as drafts and atmospheric temperature, etc. Variations in extrusion rate can occur because of variations in polymer particle configuration, varying depth of polymer particles in the supply hopper, variations in voltage to the vibrator, etc. As the difference between operating extrusion rate and optimum extrusion rate represents a significant loss in capacity, it would be highly advantageous to substantially decrease, and preferably eliminate, the difference between the operating extrusion rate and the optimum extrusion rate.

Accordingly, it is an object of the present invention to increase the operating extrusion rate. Another object of the invention is to minimize the effects of uncontrolled variations in the operation of the polymer particles feeder on the extrusion rate. A further object of the invention is to maximize the extrusion rate without exceeding the cooling capacity of the long land die. Another object of the invention is to adjust the feed rate of polymer particles to the extruder responsive to variations in the temperature of the molten thermoplastic material. Other objects, aspects and advantages of the invention will be apparent from a study of the specification, the drawings and the appended claims to the invention.

In accordance with the present invention there are provided automatic control method and apparatus for producing a signal representative of the actual rate of extrusion, comparing the thus produced signal with a signal representative of the desired rate of extrusion, and automatically manipulating the feed rate of polymer to the extruder responsive to the difference between the thus compared signals. In a presently preferred embodiment, there are also provided method and apparatus for establishing a measurement signal representative of the actual temperature of the molten thermoplastic material at the inlet of the long land die, providing a setpoint signal representative of the desired temperature for the molten thermoplastic material at the inlet of the long land die, subtracting the setpoint signal from the measurement signal, and automatically varying responsive to the difference thereby obtained the signal representative of the desired rate of extrusion or the signal representative of the actual extrusion rate.

In the drawings

Figure 2:
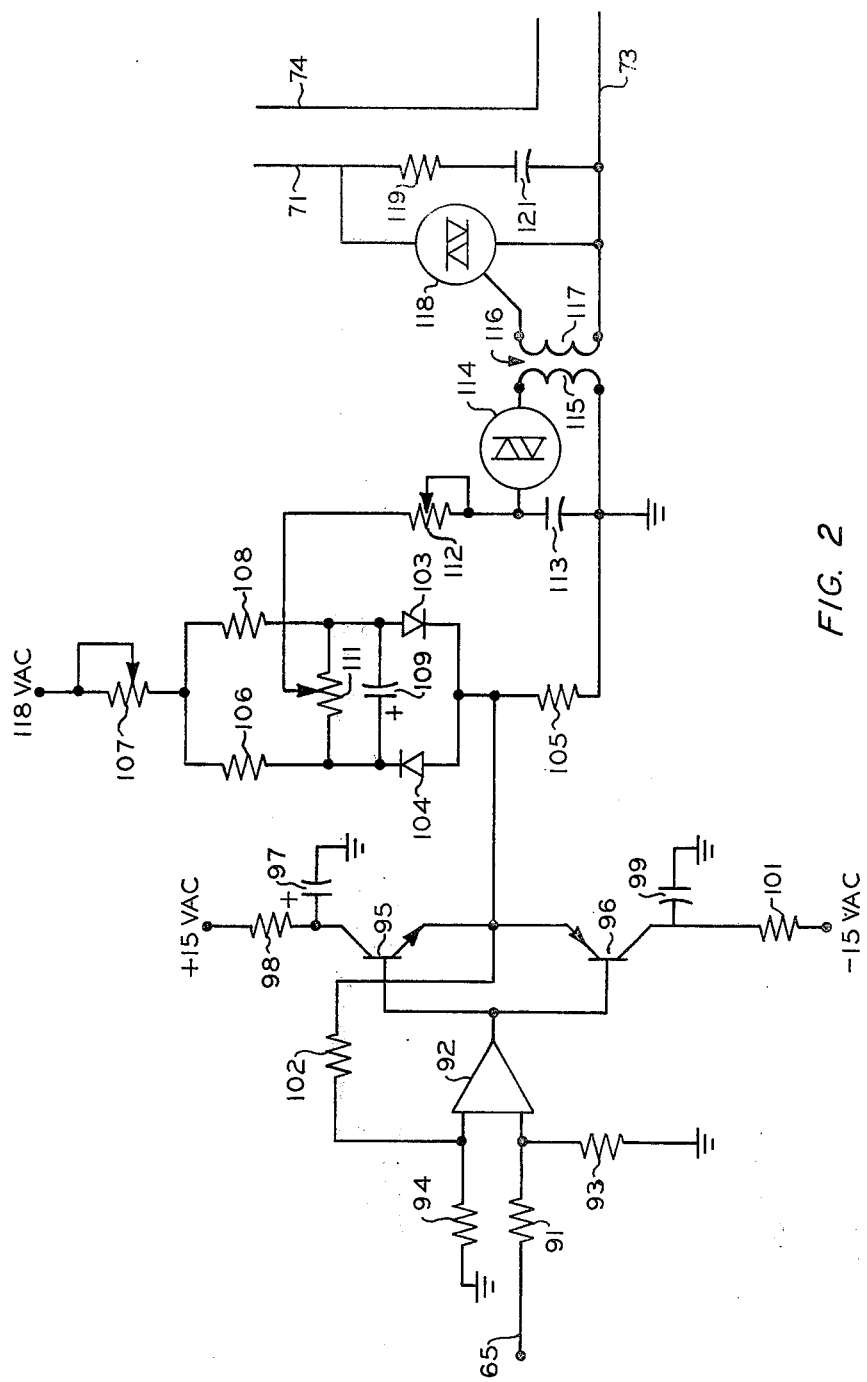

FIG. 1 is a diagrammatic illustration of a dynamic extrusion system embodying the present invention, and FIG. 2 is a schematic illustration of a triac circuit suitable for use in the system of FIG. 1.

Referring now to the drawing in detail, there is shown a dynamic extruder having a long land die section 11, a heating section 12, and a feed inlet section 13, supported by a frame 14. A piston 15 is connected to fly wheel 16 by means of a connecting rod 17 and a crosshead 18. The piston 15 is mounted for reciprocal motion in the feed inlet section 13. A motor 19 serves to impart at least substantially constant rotational motion to fly wheel 16 by means of belt 21.

A thermoplastic material in particle form, e.g. pellets, powder, or fluff, can be charged to storage hopper 22 by conveying means 23. A chute 24 is positioned below the outlet of storage hopper 22 for transmitting the thermoplastic particles from storage hopper 22 to a feed hopper 25 on feed inlet section 13. An electrically actuated vibrator means 26 is attached to chute 24 such that the flow of polymer particles from storage hopper 22 to feed hopper 25 is effected by vibrator means 26 at a rate responsive to the degree of excitation of vibrator means 26. The polymer particles are passed through feed hopper 25 into feed inlet section 13 where the polymer particles are compressed by piston 15, passed into heating section 12 and converted into molten thermoplastic material. The molten material enters long land die section 11, which is cooled by the flow of cooling water from conduit 31 through cooling passageways in die section 11 into conduit 32. The temperature of the cooling water in conduit 31 can be maintained at a substantially constant value by cooling water temperature controller 33. Makeup cool water, e.g. tap water, is supplied to controller 33 via conduit 34, while warm water can be discharged to a drain via conduit 35. Temperature controller 33 can be provided with a pump, a recirculation line and appropriate valving so that at least a portion of the warm water from conduit 32 can be recirculated to the die section 11 via conduit 31. The controller 33 can also be provided with a heater to elevate the temperature of the water passing to conduit 31 as may be required, particularly during startup. Thus, temperature controller 33 maintains the temperature of the cooling water delivered to die section 11 at a predetermined temperature which corresponds to setpoint 36, by varying the amount of warm water dumped via conduit 35 and cool tap water added via conduit 34 and/or by controlling its heater to vary the amount of heat added to the water going to conduit 31. Although various types of temperature controllers are well known and available commercially, one particular type of controller that can be employed to advantage is the Sterl Tronic S-6300 temperature control unit manufactured by Sterling, Inc., 5200 West Clinton Avenue, Milwaukee, Wis.

The residence time of the thermoplastic material in die section 11 is such that at least the outer portions of the extrudate 37 have solidified before the extrudate 37 exits die section 11. A support 38 is situated to receive the extrudate after it issues from die section 11. If desired, support 38 can be provided with means for further cooling the extrudate and/or means for exerting a pulling force on the extrudate to aid in the extrusion.

Temperature sensing and transmitting means 41 measures the temperature of the molten thermoplastic material at the inlet of the long land die section 11 and automatically establishes a first signal 42 representative thereof. This signal 42 is applied to the measurement signal input of melt temperature controller 43. A setpoint signal 44 which is representative of the desired temperature for the molten thermoplastic material at the inlet of long land die section 11 is applied to the setpoint input of controller 43. Controller 43 automatically compares setpoint signal 44 and measurement signal 42 and automatically establishes a control signal 45 responsive to the magnitude and sign of the difference between signals 42 and 44. As is well known in the control art, control signal 45 bears a predetermined relationship to the magnitude of the difference between signals 42 and 44, e.g., control signal 45 can be directly proportional to the difference between signals 42 and 44, an integration thereof, a differentiation thereof, etc., or a combination of two or more such functions, e.g., the algebraic sum of such proportional value and a bias value, or the algebraic sum of such proportional value and an integration value. In the presently preferred embodiment controller 43 produces a control signal 45 which is the algebraic sum of a proportional factor, an integration factor and a bias factor. The control signal 45 is automatically applied to the heating means (not shown) in heating section 12 to manipulate the heat input to the thermoplastic material so as to maintain the temperature of the molten thermoplastic material at the inlet of the long land die section 11 at least substantially constant at the desired value therefor.

A tachometer 51 has a rotating sensing element 52 positioned in contact with the exterior surface of extrudat 37. Tachometer 51 automatically produces a D.C. measurement signal 53 which is representative of the instantaneous rate of extrusion of extrudate 37 from the die section 11. Signal 53 is applied to lagdevice 54 wherein the signal is delayed. lag device 54 can be any suitable delay device, for example, it can consist of two identical first order lag circuits in series. The delayed signal 55, which is taken from the output of the first first order lag circuit, is a first order lag of signal 53, and is applied to the input of adder 56, the output 57 of which is applied to the measurement input of polymer feed rate controller 58. The delayed signal 59, which is taken from the output of the second first order lag circuit, is a first order lag of the first order lag of signal 53 (approximately equivalent to a second order lag), and is applied to the input of a digital rate panel meter 60. Lag device 54 is utilized in tis embodiment as a low pass filter. As the tachometer sensor 52 operates at a very slow speed, the signal 53 has considerable spurious noise. The first stage of lag device 54 allows the signal 53 to pass through with just sufficient filtering action so that controller 58 does not follow the noise. The second stage of lag device 54 further smooths the signal for display by rate panel meter 60. Melt temperature measurement signal 42 is applied to the subtrahend input of subtractor 61, while setpoint signal 44 is applied to the minuend input of subtractor 61. Signal 62, representing the algebraic difference between signals 42 and 44 is applied to one input of algebraic adder 56. A setpoint signal 63 representing the desired extrusion rate is applied to the setpoint input of polymer feed rate controller 58. The output signal 65 from controller 58 is responsive to the difference between modified measurement signal 57 and setpoint signal 63. Thus output signal 65 bears a predetermined relationship to the magnitude and sign of signal 62. As with controller 43, controller 58 can have any suitable type of controller function known in the art, but preferably has a proportional plus integral function. Signal 65 is applied to the input of triac circuit 68. Triac circuit 68 is connected by wire 71 to one terminal of A.C. power source 72 and by wire 73 to one power terminal of vibrator mechanism 26. Wire 74 connects the other terminal of A.C. power source 72 to the second power terminal of vibrator mechanism 26. Triac circuit 68 varies the A.C. power going to vibrator mechanism 26 responsive to variations in the D.C. signal 65. The variation in A.C. power to vibrator mechanism 26 effects a corresponding variation in the feed rate of polymer particles to hopper 25. Thus the feed rate of polymer particles to the plasticization section of the extruder is automatically manipulated by the present control system to maintain the actual extrusion rate at least substantially constant at the desired value therefor. In the presently preferred embodiment wherein the output of polymer feed rate controller 58 is also responsive to the variations 62 of the temperature of the molten polymer entering the long land die section 11 from the desired temperature for the molten polymer entering the long land die section 11, the feed rate of polymer to the plasticization section of the extruder is automatically manipulated by the control system to maintain the extrusion rate at least substantially constant at the desired value therefor to the maximum extent permitted by the difference between the actual and desired values of the temperature of the molten polymer at the inlet of the long land die section 11.

The rotating sensing element 52 can be provided with means for periodically interrupting the light beam between light source 81 and a phototransistor 82, so that phototransistor 82 produces a series of pulses having a frequency correlated to the extrusion rate. The pulses from phototransistor 82 can be applied to an input of digital counter 83 wherein the pulses are counted as an indication of the extruded length of the current article being extruded beyond a reference point (e.g. the cutting element of cutter mechanism 85). When the length of the current article reaches the desired value, digital counter 83 can be employed to transmit a signal to solid state relay 84 to actuate cutter mechanism 85 to sever the portion of the extrudate downstream of cutter 85. The digital counter 83 can be provided with an automatic reset to zero when the extruded length of the current article downstream of cutter mechanism 85 reaches the desired value or a manual reset 86 can be employed when the relay 84 is omitted and the operator actuates the cutter mechanism 85. A digital display 87 can be connected to digital counter 83 to provide a visual indication of the current length of production beyond the reference point and/or the totalized length of production subsequent to a reference time point.

Referring now to FIG. 2, resistor 91 connects wire 65 to a first input of operational amplifier 92, resistor 93 connects the first input of amplifier 92 to ground, and resistor 94 connects the second input of amplifier 92 to ground. The output of amplifier 92 is connected to the bases of each of transistors 95 and 96. The collector of transistor 95 is connected through capacitor 97 to ground and through resistor 98 to a +15 volts D.C. power source. The collector of transistor 96 is connected through capacitor 99 to ground and through resistor 101 to a −15 volts D.C. power source. The emitter of transistor 95 is connected to the emitter of transistor 96, through feedback resistor 102 to the second input of amplifier 92, to the cathode of diode 103, to the anode of diode 104, and through resistor 105 to ground. Thus transistors 95 and 96 are connected to form a complementary emitter follower circuit. The cathode of diode 104 is connected through resistor 106 to a first end of variable resistor 107, while the anode of diode 103 is connected through resistor 108 to the first end of variable resistor 107. The second end of variable resistor 107 is connected to a 118 volts A.C. power source. Capacitor 109 and potentiometer 111 are connected in parallel between the cathode of diode 104 and the anode of diode 103, with the contactor of potentiometer 111 being connected through variable resistor 112 and capacitor 113 in series to ground. A diac 114 and the primary coil 115 of transformer 116 are connected in series between ground and the junction between variable resistor 112 and capacitor 113. The secondary coil 117 of transformer 116 is connected between the gate and the first anode of triac 118. Resistor 119 and capacitor 121 are connected in series between the second anode and the first anode of triac 118. Wire 71 is connected to the second anode of triac 118 while wire 73 is connected to the first anode of triac 118.

This circuit combines a single triac 118 with a diac 114 for triggering. The capacitor 113 is charged alternately positive and negative as the A.C. supply voltage between the second terminal of resistor 107 and ground varies. When the voltage across diac 114 reaches a reference value, the diac 114 breaks down and the gate circuit of triac 118 receives a pulse of current, and the triac 118 is brought into conduction if its anode voltage is of sufficient amplitude and proper polarity. The adjustment of the gain resistor 112 adjusts the slope of the voltage waveform. The balance potentiometer 111 can be used to center the voltage waveform precisely between the positive and negative breakdown voltage values no input signal applied. The dead-band resistor 107 allows the voltage at the diac input terminal, i.e. the junction of resistor 112, capacitor 113 and diac 114, to just approach the diac breakdown voltage values with no input signal applied. Then if a positive D.C. signal is applied across resistor 105, the voltage at the diac input terminal is increased so that th positive breakdown voltage of the diac 114 is exceeded and diac 114 conducts. This in turn causes the triac 118 to conduct for the remainder of the duration of the line voltage half cycle. On the other hand, if a negative D.C. signal is applied across resistor 105, the voltage at the diac input terminal is lowered to the point that the negative breakdown voltage of the diac 114 is exceeded and diac 114 conducts in the other direction. This occurs during the opposite half cycle of the line voltage, so the triac 118 conducts through the remainder of the duration of the negative half cycle of the line voltage. The larger the magniitude of the input signal across resistor 105, the earlier in the respective half cycle that the triac 118 will conduct. Although the use of a constant-voltage transformer 116 avoids the problem of supply voltage variations, the phase shift of the transformer is dependent on the loading. If the phase shift is too great, the last diac conduction may occur after the anode voltage on triac 118 has changed polarity. If this occurs, the load is subject to a full half cycle of line voltage in the opposite direction from that which was just applied. If necessary, this can be avoided by utilizing optical isolation elements instead of transformer 116.

Although the invention has been illustrated in terms of an electronic system, any suitable automatic measuring components and automatic control components known in the art can be employed to construct the invention, including electrical components, pneumatic components, mechanical components, and combinations thereof, with either analog or digital output signals. In one presently preferred embodiment melt temperature controller 43 is a West 800 Time-proportioning temperature controller manufactured by West Instrument Division, Gulton Industries, 3860 N. River Road, Schiller Park, Ill.; lag circuit 54 is a lag card BO 3989, manufactured by Applied Automation, Inc., Pawhuska Road, Bartlesville, Okla.; and tachometer 51 is a model 60/A/05 tachometer manufactured by Wertronix, 2673 Culver Ave., Dayton, Ohio. Adder 56 and polymer feed rate controller are collectively an Optrol ® A controller card BO 3979 manufactured by Applied Automation, Inc., with signal 55 being applied to pin 15, setpoint 63 being applied to pin 13, signal 61 being applied to pin 14 and signal 65 being taken from pin 4; pins 6 and 12 being joined, pins 8 and 16 being joined, and pins 10 and 11 being connected by a front panel meter. While the invention has been illustrated as using the melt temperature variations signal 62 to modify the extrusion rate signal 55 because of the characteristics of the Optrol A controller card BO 3979, it is within the scope of the invention for the extrusion rate signal 55 to be applied to the measurement input of polymer feed rate controller 58 and for the melt temperature variation signal to be employed to modify the setpoint signal 63. In either event, the control signal 65 bears a predetermined relationship to the magnitude and sign of the difference between the actual extrusion rate and the desired extrusion rate as well as the magnitude and sign of the variation of the actual molten polymer temperature from the desired molten polymer temperature.

While the polymer feeder has been illustrated as a vibrating mechanism, any suitable feeding means can be employed so long as the rate of feeding of the polymer particles to the polymer plasticization section of the extruder can be manipulated by the polymer feed rate controller 58. For example a variable speed extruder screw could be employed in place of piston 15 with the screw being flood fed by a hopper immediately above the polymer inlet section so that the polymer feed rate to the polymer plasticization section of the extruder can be manipulated by varying the speed of the extruder screw.

Reasonable variations and modifications are possible within the scope of the foregoing disclosure, the drawings and the appended claims to the invention.

I claim:

1. Automatically controlled extruder apparatus comprising:

an extruder having a plasticization section and a long land die section for producing an extrudate of a predetermined cross section, means operatively associated with said plasticization section and said long land die section for moving material through said plasticization section and then through said long land die section, heating means operatively associated with said plasticization section for supplying heat to said material in said plasticization section so that said material is molten at the inlet of said long land die section, cooling means operatively associated with said long land die section for removing heat from said material in said long land die section so that at least the outer portions of the extrudate solidify before leaving said long land die section;

feed means operatively associated with said extruder for feeding particles of said material into said plasticization section at a manipulatable rate; and automatic control means operatively associated with said extruder and said feed means comprising means for measuring the actual rate of extrusion of said extrudate and establishing a first signal representative thereof, means for establishing a second signal representative of the desired rate of extrusion of said extrudate, means responsive to said first and second signals for establishing a third signal which bears a predetermined relationship to the magnitude and sign of the difference between said actual rate of extrusion and said desired rate of extrusion, and means responsive to said third signal for adjusting said feed means to manipulate the rate of feeding of particles into said plasticization section to maintain said actual rate of extrusion at least substantially equal to said desired rate of extrusion.

2. Apparatus in accordance with claim 1 wherein said automatic control means comprises means for measuring the actual temperature of the molten material at the inlet of said long land die section and establishing a fourth signal representative thereof, means for establishing a fifth signal representative of the desired temperature for the molten material at said inlet of said long land die section, means responsive to said fourth and fifth signals for controlling said heating means to maintain said actual temperature at least substantially at said desired temperature.

3. Apparatus in accordance with claim 2 wherein said automatic control means further comprises means responsive to said fourth and fifth signals for establishing a sixth signal responsive to the magnitude and sign of the difference between said fourth and fifth signals; and wherein said means for establishing a third signal is responsive to said first, second and sixth signals to establish said third signal as a predetermined relationship to the magnitude and sign of the variation of said actual temperature from said desired temperature as well as the magnitude and sign of the difference between said actual rate of extrusion and said desired rate of extrusion.

4. Apparatus in accordance with claim 3 wherein said feed means comprises a vibrating feed mechanism and said means for adjusting said feed means controls the vibration of said vibrating feed mechanism.

5. Apparatus in accordance with claim 4 wherein said means for measuring the actual rate of extrusion comprises a tachometer and means for filtering the output signal of said tachometer to produce said first signal.

6. Apparatus in accordance with claim 5 wherein said means for establishing a third signal comprises a proportional plus integral controller.

7. Apparatus in accordance with claim 6 wherein said means for establishing a third signal further comprises an algebraic summing means for producing a seventh signal responsive to the algebraic sum of said first and sixth signals, and means for applying said seventh signal to the measurement signal input of said proportional plus integral controller.

8. Apparatus in accordance with claim 1 further comprising means for severing said extrudate, and wherein said automatic control means further comprises means responsive to said first signal for establishing a fourth signal representative of the length of the extrudate with regard to a reference point and means responsive to said fourth signal to actuate said means for severing to cut said extrudate into segments of predetermined length.

* * * * *